July 1, 1930.  E. E. SCHNELLE  1,768,935
BELT HOOK
Filed Dec. 21, 1928

Inventor
Ernest E. Schnelle
By Eric Schinger, Attorney

Patented July 1, 1930

1,768,935

UNITED STATES PATENT OFFICE

ERNEST E. SCHNELLE, OF ROCHESTER, NEW YORK

BELT HOOK

Application filed December 21, 1928. Serial No. 327,639.

My present invention relates to belt hooks of the type in which a plurality of shanks and tangs are used for fastening and holding the ends of a belt together and the present improvement has for its various objects:

To provide a compact, cheap and very efficient belt hook which will embed itself into the belt when applied thereto.

To provide a belt hook which can be applied without the use of a special tool.

To provide a belt hook having a plurality of hooks with tangs on the end of them which are simultaneously forced into the end of the belt by providing means that connect the hooks to hold them properly in spaced relation to one another while the connecting means simultaneously lines up the hooks with relation to the belt end.

All these and other objects of this invention will be apparent from the accompanying drawing, the specification and the appended claims forming a part thereof.

In the accompanying drawing.

In the several figures of the drawing like reference numerals indicate like parts.

Figure 1:
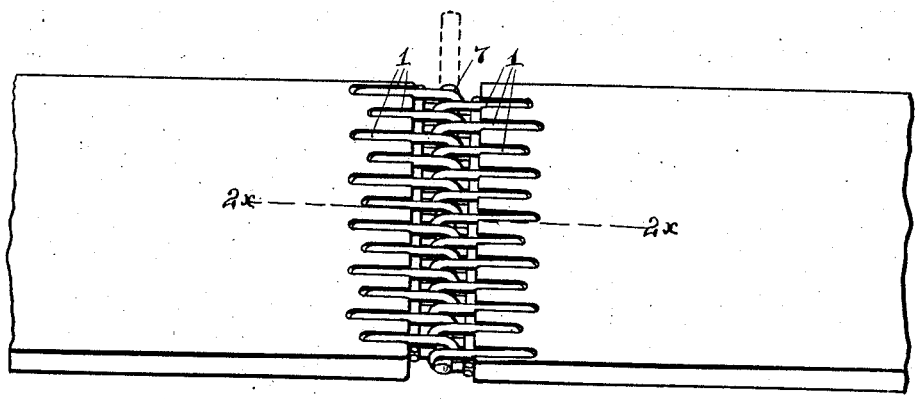
Figure 1 is a perspective view of the ends of an endless belt which are fastened together by means of my improved belt hook.
Figure 2:
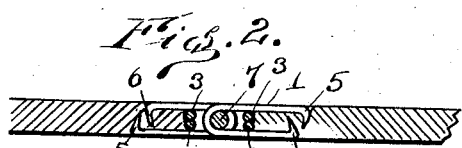
Figure 2 is a longitudinal sectional view of the belt ends and the belt hooks, the section being taken on the line 2×—2× of Figure 1.
Figure 3:
Figure 3 is a side elevation of the end of a belt with one of the belt hooks ready to be applied thereto.

The belt hook forming the subject matter of my present invention is used for the purpose of fastening or "lacing" together the ends of a transmission belt in a manner that will make the joint strong, durable, and what is most important, safe to the man who is working near the moving belt and is liable to come in contact with it. The belt hook is made up of a plurality of hook members that are firmly held together so that none of the hook members or part of them can come out and project from the belt and either fly off or catch itself into anything that is very close to it. The belt hook is also made to embed itself into the surface of the belt so that no part of it will protrude from the surface and cause a click or knock every time the hook passes over the pulley. Embedding the hook members will also prevent defacing the surface of the pulley. Furthermore the belt hook is made to form a joint in the belt that will readily accommodate itself to the curvature of the pulleys, both large and small, and will not tend to buckle the belt at its joint or joints. Due to the fact that the belt hook is made up of individual hook members that are firmly held together by a connecting link the belt hook can be applied to the belt without the aid of any special apparatus and only a hammer is needed to attach the belt hook to the belt ends. The elimination of special apparatus also gives an unobstructed view of the belt end making possible a perfect alignment of the belt hook on the belt end.

The individual hook members as well as the connecting link are preferably made up of round wire stock and because they are made of stock in which the cross sectional diameter decreases toward the side that is brought in contact with the belt, the hook members will readily embed themselves into the surface of the belt when pressure is applied to them. As pointed out above, all the hook members are firmly held together by a link or links so that all of the hooks are jointly lined up and applied together to the end of the belt. One blow from a hammer will therefore partially close all or a part of the hook members and bring them in engagement with the belt in proper alignment and hold them anchored thereto so that the individual hook members can then be hammered into their final embedded position. Each hook member is thus individually and uniformly hammered in place. The belt hooks may be applied anywhere even while the belt hangs suspended from a pulley because no special apparatus is needed outside of the hammer and a supporting surface against which the belt end may be placed while the hooks are hammered in.

The belt hooks made up of individual hook members thus retain the advantages of individual hooks, one of which is the ability to embed the hooks into the surface of the belt, but add to this the advantages of united hooks which stay united at all times, cannot fall apart, can be lined up on the end of a belt as a unit and be driven in place as a unit with a hammer.

As illustrated in the several figures of the drawing the improved belt hook comprises a series of individual hook bodies 1, which are fastened together by the connecting links or bars 3 and 4. When properly bent up each of the hook bodies 1 consists of a practically V-shaped wire having a rounded apex and with one side of the V longer than the other. The outer ends of both the long and short sides of the V shaped hook bodies are bent inwardly and are sharpened to form tangs 5 and 6 thereon.

As illustrated in the figures of the drawing the hook members are placed in spaced relation to each other and side by side with the long and short sides of these members alternating so that a long hook and its tang on one side confronts a short hook and its tang on the other side. When the tangs of the belt hooks are therefore driven into the belt the tang on the short side will be offset from the tang on the long side of each hook member. In this way the engagement of the tangs with the belt will not interfere with each other as they will engage at different points in the belt so that the grip of the belt hook will be strong and cannot loosen or tear out of the belt either partially or wholly. The tangs on both the short and long sides of the hook are preferably of the same length and penetrate the belt to the same depth.

The connecting links or bars 3 and 4 also serve as a gage for lining up the belt hook with relation to the edge at the ends of the belt. These links or bars provide two parallel shoulders on the inside of the hook against which the edge of the end of the belt is placed before it is closed to force the tangs into the belt in the manner above described and illustrated in the drawing.

When a belt hook has been applied to each of the free ends of the belt a series of closed loops are formed at each end of the belt in staggered relation to each other. The loops of one belt hook are then brought in engagement between the loops of the other belt hook to bring them in line with one another and allow the connecting pin to pass thru them and form the pivot of the joint between the two belt hooks and the ends of the belt to which they are fastened.

Figures 4, 5:
Figure 4 is a longitudinal sectional view similar to that shown in Figure 3 showing a modified form of the hook for connecting the belt ends, in which but one connecting link is used to hold the hook members together.
Figure 5 is a detail perspective view of the connecting pin or link with which the belt hooks are held together.
Figure 9:
Figure 9 is a side elevation of a modified form of the hook in which the hook members are of the same length on both sides and by which the hooks are held together with but one or more connecting links.
Figure 6:
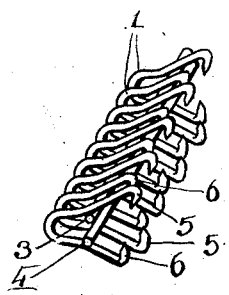
Figure 6 is a detail perspective view of a series of the belt hooks as they appear when bent up ready to be applied to the end of a belt.
Figures 7, 8:
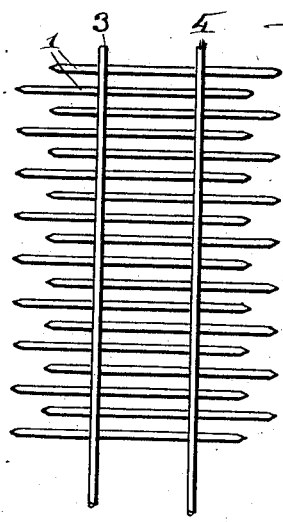
Figure 7 is a top plan view of a series of the belt hooks as they appear before they are bent up into their proper form.
Figure 8 is a cross section of a wire having a triangular cross section from which the belt hooks may be formed.

In Figure 4 I have shown that it is not necessary to use two connecting links or bars for holding the individual hooks in spaced relation to one another. One such connecting link is sufficient to hold them together. If but one such link is used it is possible to place the belt end beyond this bar instead of against it. The belt hook then engages a larger portion of the end of the belt and brings the joint between the ends of the belt closer together. The fact that the connecting bar is made of round wire stock will allow this member to embed itself into the surface of the belt with the remainder of the hook members.

As illustrated in the figures of the drawings the connecting bars are simply welded to the inside of the hook members and this has been found to be very practical when done by electric welding. The individual parts forming the belt hook are placed in a suitable jig where they are held in proper relation to each other so that when the current is applied all of the hook members are simultaneously welded together.

I claim:

1. A belt hook comprising a series of hook members made up of material having a cross section adapted to wedge itself into the surface of the belt when pressure is applied to the outside thereof, a straight connecting bar welded to said hook members to hold said hook members in fixed spaced relation to one another and extending directly form one hook member to the other to form an integral shoulder and connecting member on the inside of said hook members the full length of the belt hook.

2. A belt hook comprising a series of hook members made up in the form of a V and having a long and short side, a tang formed at the end of each of the short and long sides of said V shaped hook members adapted to engage the upper and lower surface of a belt in offset relation to each other, a connecting bar welded to said hook members to form an integral part therewith and connect said hook members side by side in fixed spaced relation with each other.

3. A belt hook comprising a series of individual V shaped hook members arranged side by side formed up of material having a cross section of decreasing diameter toward one side thereof so as to embed itself into the surface of a belt and have its surface flush with the surface of the belt, a straight connecting bar welded rigidly to the inside of said hook members to hold said hook members in spaced relation with each other and form a continuous shoulder within the hook members against which the edge of the belt can be lined up.

In testimony whereof I affix my signature.

ERNEST E. SCHNELLE.